UNITED STATES PATENT OFFICE.

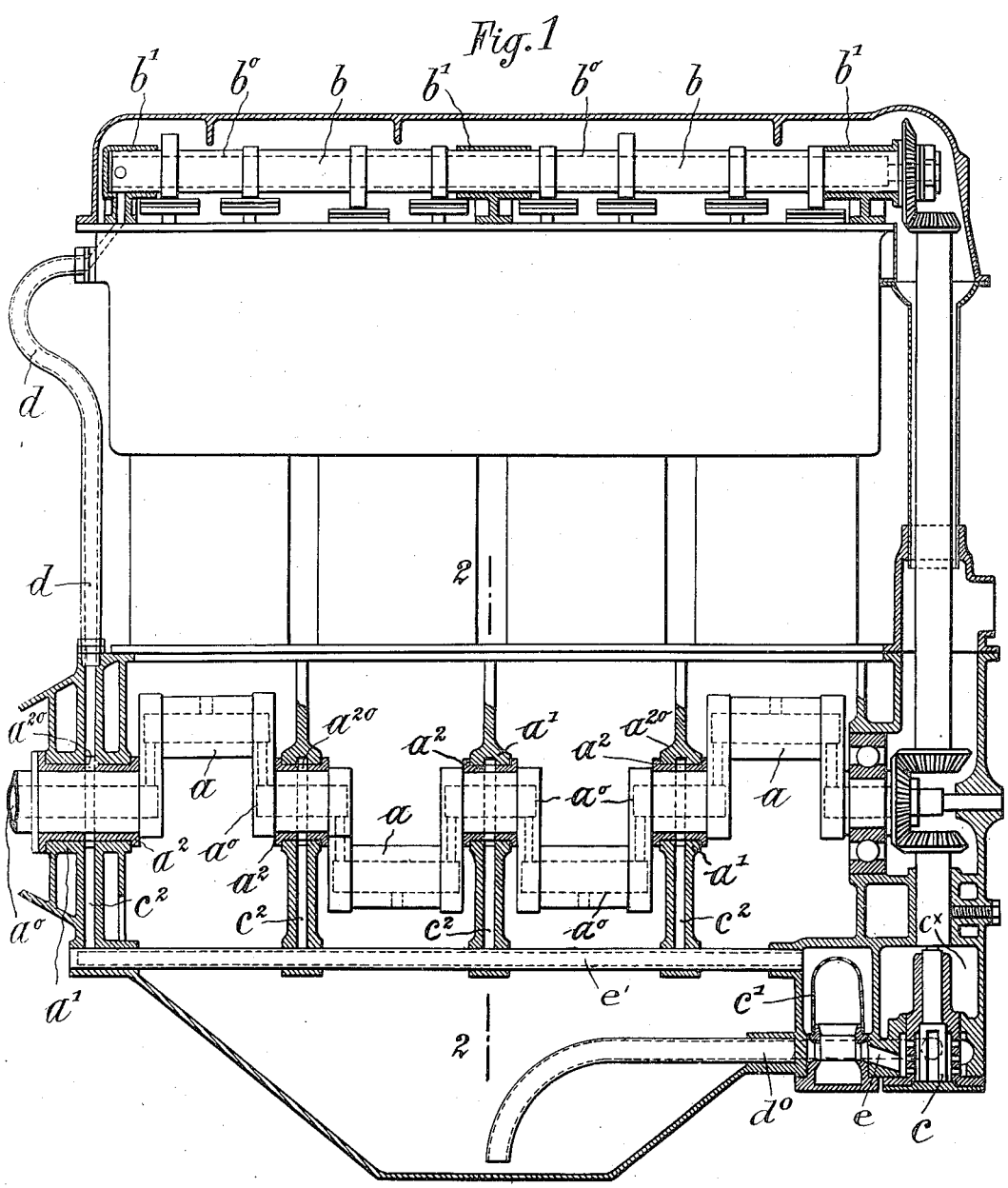

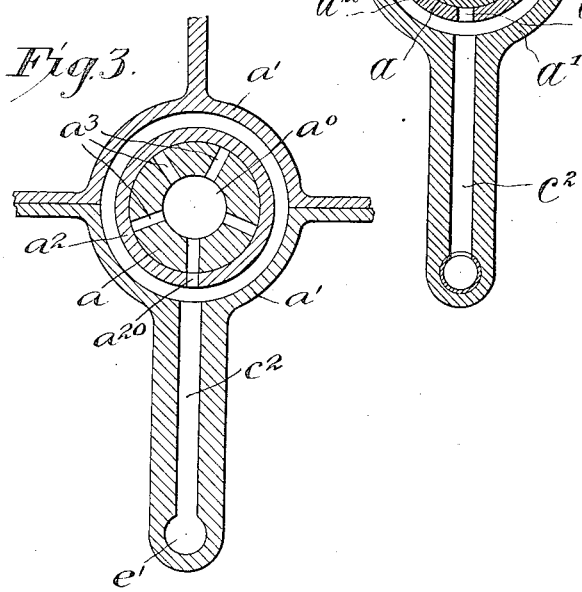

MARC BIRKIGT, OF BOIS-COLOMBES, FRANCE.

FORCED LUBRICATION.

1,241,332.   Specification of Letters Patent.   Patented Sept. 25, 1917.

Application filed January 4, 1916. Serial No. 70,255.

*To all whom it may concern:*

Be it known that I, MARC BIRKIGT, engineer, a citizen of the Republic of Switzerland, residing at Bois-Colombes, Department of Seine, France, have invented certain new and useful Improvements in Forced Lubrication, of which the following is a specification.

This invention relates to forced lubrication for machines, particularly for explosion engines, in which the lubricant passes from fixed bearings into a central conduit provided in a shaft rotating in the said bearings.

This invention has for its object to enable arrangements of forced lubrication to be designed so as to simplify their construction and at the same time render their working more satisfactory than hitherto.

The invention comprises an arrangement of forced lubrication in which the passage of the lubricant from each bearing into the central conduit takes place a large number of times for each revolution of the shaft.

The invention further comprises other arrangements more fully described hereinafter.

In the accompanying drawing which shows an explosion engine provided with forced lubrication according to this invention;

Figure 1 is a vertical section and

Fig. 2 is a section on the line 2—2 of Fig. 1, on a larger scale.

Fig. 3 is a similar view showing a modification of the oil passages of Fig. 2.

The explosion engine is fitted with a crank shaft $a$ and with a cam shaft $b$ mounted above the cover of the cylinders, for driving directly the inlet and exhaust valves of the said engine.

At the bottom portion of the crank case of the engine, there is arranged, within a suitable compartment $c^x$, a rotary lubricating pump $c$, having an inlet or suction pipe $d^o$, which draws up the lubricant from the bottom of the said crank case, and also having an exhaust pipe $e$ through which the lubricant is forced from the pump under pressure. The outlet from the latter pipe communicates with a screen or filter $c'$, and the lubricant is forced through this filter and into a horizontal pipe $e'$, which delivers it into a series of conduits $c^2$, said conduits terminating in the interior of the bearings $a'$ of the crank shaft $a$. In the bearing bushing $a^2$ of each bearing $a'$, there is made a series of perforations $a^{20}$, (Fig. 2), which are preferably arranged at equal angular distances apart, and are adapted to successively register, during each revolution of the crank shaft, with a single radial passage $a^3$, formed in said crank shaft; the inner end of this passage $a^3$ opening into an axial conduit $a^o$. The perforations $a^{20}$ in each bushing $a^2$ lie in a common plane, in which the passage $a^3$ also lies, as will be understood. However, the arrangement just described, while preferred, may be reversed, in which case there will be a single perforation $a^{20}$ in the bushing $a^2$, and a series of radial passages $a^3$ in the crank shaft, as represented in Fig. 3.

Owing to this, the circulation of lubricant no longer takes place in jerks as hitherto but in a practically continuous manner, which enables a very great pressure to be given to the lubricant, without producing any excessive losses of load rendering the strong pressure useless.

The valve gear is arranged as usual, the lubricant being supplied through the conduit $a^o$ to the bearings of the connecting rod heads and to other parts to be lubricated. Moreover the lubricant can be sent directly through a conduit $d$ from one of the bearings $a^1$ of the crank shaft to one of the bearings $b^1$ of the cam shaft $b$, whence it passes through means similar to those described for the crank shaft, into a central conduit $b^o$ of the said cam shaft which supplies it to the other bearings of the said shaft, as well as to other parts of the valve gear which it is desired to lubricate.

Obviously, the invention is not limited to the arrangements described, but comprises any modifications within the scope of the claims.

Having now described and ascertained the nature of my said invention and in what manner the same is to be performed, I declare that what I claim is:—

1. In a lubricating system, the combination of a shaft having a central conduit; a bearing for said shaft; and means for supplying lubricant to said bearing, said shaft and said bearing constituting a pair of companion parts in port communication with the conduit in said shaft, one of such parts having a radial port, and the other part having a plurality of radial ports adapted to successively register with the first-named port, whereby the lubricant supplied to said bearing may pass from the latter to said shaft a predetermined number of times for each revolution of the shaft.

2. In a lubricating system, a shaft having a central conduit and a passage radially extending from the conduit to the periphery of the shaft, bearing bushings for the shaft provided with a plurality of openings, the axes of said openings being in one and the same plane with relation to the shaft, said passage in the shaft being adapted to consecutively register with said openings, whereby a lubricant may pass from the exterior of said bushing to the conduit in said shaft, a predetermined number of times for each revolution of the shaft.

3. In a lubricating system, the combination of a crank shaft, a plurality of bearings for said shaft, said shaft having a central conduit and said bearings having a passage, a conduit connected with said passages in the bearings for distributing lubricant to the latter, means for forcing the lubricant through said conduit, and bushings interposed between each bearing and shaft each having a plurality of openings therein communicating with the passage of the bearing, said shaft having passages extending from the periphery thereof to the conduit therein and adapted to consecutively register with openings of the bushings whereby the lubricant may pass a predetermined number of times for each revolution of the shaft from said passages of the bearings to the conduit of said shaft.

In testimony whereof I have hereunto set my hand in presence of two subscribing witnesses.

MARC BIRKIGT.

Witnesses:
 CHAS. P. PRESSLY,
 PAUL BLUM.